United States Patent Office 3,623,890
Patented Nov. 30, 1971

3,623,890
FROZEN FOOD CONFECTION AND METHOD FOR MANUFACTURE THEREOF
Robert B. Klein, Des Plaines, Ill., assignor to Kraftco Corporation, New York, N.Y.
No Drawing. Filed Apr. 1, 1968, Ser. No. 717,959
Int. Cl. A23g 5/00
U.S. Cl. 99—136                                           4 Claims

ABSTRACT OF THE DISCLOSURE

A food composition is provided which is suitable for freezing to provide a frozen confection. The food composition comprises a crystal conditioning agent selected from mixtures of glycerin and propylene glycol. The crystal conditioning agent is provided at a level sufficient to attain a desirable soft, non-brittle, almost pliable structure in the food composition when the food composition is frozen.

---

The present invention relates generally to food products, and more particularly relates to frozen confections which are formed from a water base.

Various water-base frozen confections are known to the food industry. These are generally prepared from a solution of sugar and coloring and flavoring materials in water. The solution is then usually frozen while in quiescent condition. Such water-base frozen confections are usually prepared with a stick frozen therein to permit holding the frozen confection while it is consumed.

Such prior art water-base frozen confections have numerous disadvantages. The crystal structure of the frozen confection is generally undesirable in that it has a hard, sharp, needle-like, brittle mouth feel. Also, it is sometimes undesirable to provide frozen confections with a stick protruding therefrom. Objections have been raised in connection with this type packaging in that the protruding stick presents a safety hazard.

Accordingly, it is an object of the present invention to provide an improved water-base frozen confection. It is another object of the present invention to provide a water-base frozen confection having an improved, soft crystal structure. It is a further object of the present invention to provide an improved water-base, frozen confection composition that is suitable for packaging in a novel manner and a method for packaging the same.

These and other objects of the present invention will become more apparent from a reading of the following detailed description:

In general, the present invention is directed to a food composition suitable for providing a frozen confection by freezing. The food composition includes a sweetening agent and a crystal conditioning agent. The crystal conditioning agent is selected from mixtures of glycerin and propylene glycol. The crystal conditioning agent is provided at a level suitable to attain a desirable soft crystal structure in the food composition when the food composition is frozen, as will be explained more fully hereinafter. The present invention also provides a method for packaging a food composition suitable for providing a frozen confection that permits dispensing of the confection by hand without the necessity for using a stick or other rigid implement to hold the frozen confection.

The crystal conditioning agent of the invention is added to the food composition at a level sufficient to provide a desired crystal softening effect when the food composition is frozen. In this connection, the food composition of the invention provides a soft, non-brittle, almost pliable consistency when subjected to freezing conditions. In this connection, also, the term "freezing conditions" refers to temperatures below about 20° F. Such temperatures are readily available in home type refrigerators. When prior art water-base food compositions are frozen at such temperatures the consistency, as previously described, has a hard, sharp, needle-like, brittle mouth feel.

In general, the level of addition of the crystal conditioning agent is at least about 0.35 percent by weight of the total weight of the frozen confection composition. At higher levels of addition of the crystal conditioning agent up to a level of about 1.30 weight percent some further improvement is obtained in the consistency of the food composition when frozen. Above this level no further improvement is obtained, and above a level of about 1.3 weight percent the crystal conditioning agent of the invention may provide an undesirable taste. At levels of use above about 0.8 weight percent, within the indicated preferred range, lower freezing temperatures, such as about 0° F. may be used and still achieve the desired soft non-brittle consistency in the frozen confection.

It is preferred to select the conditioning agent of the invention from mixtures of glycerin and propylene glycol having a ratio of glycerin to propylene glycol of from about 1:1 to about 9:1. It is particularly preferred to use a combination of glycerin and propylene glycol comprising 75 percent glycerin and 25 percent propylene glycol by weight, i.e., a ratio of 3:1.

In accordance with the invention, a concentrated base composition may be prepared which is suitable for shipping and distribution and which may be subsequently diluted to the desired level of solids. In this connection, the concentrated base composition contains flavors, colors, water and the crystal conditioning agent of the present invention. After distribution to a processor or to the consumer, the concentrated base composition is diluted to the desired level of solids and an edible acid, salt, sweetening agents and preservatives or a combination thereof may be added.

As a specific example, the below indicated list of ingredients would provide 3.0 gallons of a concentrated cherry flavored base composition suitable for preparing a food composition which is suitable for freezing to provide a frozen confection:

| Ingredients: | Weight |
|---|---|
| Sucrose | 474 lbs. |
| Citric acid (food grade) | 5 lbs., 11 oz. |
| Salt | 13 oz. |
| Sodium benzoate | 1 lb., 5 oz. |
| Water | 2,178 lbs. |

The cherry-flavored food composition may be marketed in bulk quantities for freezing at home by the consumer in a suitable container, such as an ice cube tray.

The above-described composition is particularly suitable for packaging in a tube-shaped flexible container to provide a portion-sized amount of the food confection. For this embodiment of the invention, a portion-sized amount of the composition is packaged in a tube-shaped, fluid impermeable, flexible container, such as a cellophane/polyethylene laminate. After packaging, the tube is sealed. The flexible container containing the food composition in liquid form is purchased by the consumer and may thereafter be frozen in a home freezer to provide a frozen confection. The frozen confection is then consumed by tearing or cutting off one end of the flexible container and squeezing the other end of the container to force the frozen confection from the end of the package which has been opened. This obviates the need or necessity for providing a stick in the frozen confection and provides a safer, more desirable frozen confection product with an improved consistency and mouth feel.

The conditioning agent of the invention provides a water-base frozen confection with an improved soft crystal formation that is free from gumminess or other undesirable mouth feel. The frozen confection has a slower melt-down than prior art water-base frozen confections, and may be subjected to repeated freeze-thaw cycles without product deterioration.

What is claimed is:

1. A composition of the type suitable for quiescent freezing to provide a flavored water-base frozen confection with a soft, non-brittle body, which composition is a mixture consisting essentially of water, flavoring materials and a crystal conditioning agent, said crystal conditioning agent being selected from mixtures of glycerin and propylene glycol, having ratios of glycerin to propylene glycol of from about 1:1 to about 9:1, and said crystal conditioning agent being present in said composition at a level of from about 0.35 percent to about 1.30 percent by weight.

2. A composition in accordance with claim 1 wherein said crystal conditioning agent is about 75 percent glycerin and about 25 percent propylene glycol by weight.

3. A method for providing a water-base confection of the type suitable for quiescent freezing so as to provide a frozen water-base confection having a soft, non-brittle body which method comprises preparing a mixture consisting essentially of water and flavoring materials, and adding a crystal conditioning agent to said mixture, said crystal conditioning agent being selected from mixtures of glycerin and propylene glycol having a ratio of glycerin to propylene glycol of from about 1:1 to 9:1, said crystal conditioning agent being added at a level sufficient to provide from about 0.35 percent to about 1.3 percent by weight of said crystal conditioning agent in said mixture.

4. A method in accordance with claim 3 wherein said crystal conditioning agent comprises about 75 percent glycerin and about 25 percent propylene glycol by weight.

References Cited

UNITED STATES PATENTS

| | | | |
|---|---|---|---|
| 2,168,934 | 8/1939 | Haskins | 99—136 |
| 2,823,129 | 2/1958 | Steinitz | 99—136 |
| 2,876,104 | 3/1959 | Bliudzius et al. | 99—136 |

RAYMOND N. JONES, Primary Examiner

J. M. HUNTER, Assistant Examiner